United States Patent
Bomans et al.

(10) Patent No.: US 6,236,913 B1
(45) Date of Patent: *May 22, 2001

(54) METHOD AND DEVICE FOR INPUTTING AND CONTROLLING FLIGHT DATA

(75) Inventors: Muriel Bomans, Antony; Sylvie Grand-Perret, Marcoussis, both of (FR)

(73) Assignee: Sextant Avionique, Velizy Villacoublay (FR)

(*) Notice: Subject to any disclaimer, the term of this patent is extended or adjusted under 35 U.S.C. 154(b) by 0 days.

This patent is subject to a terminal disclaimer.

(21) Appl. No.: 09/147,212
(22) PCT Filed: Apr. 22, 1997
(86) PCT No.: PCT/FR97/00718
§ 371 Date: Oct. 29, 1998
§ 102(e) Date: Oct. 29, 1998
(87) PCT Pub. No.: WO97/41495
PCT Pub. Date: Nov. 6, 1997

(30) Foreign Application Priority Data

Apr. 30, 1996 (FR) .................................................. 96 05426

(51) Int. Cl.$^7$ ................................ G05D 3/00; G06F 7/00
(52) U.S. Cl. ........................ 701/3; 701/14; 340/972; 340/973; 345/326; 345/329; 244/221
(58) Field of Search ........................ 701/3, 14, 15, 701/16, 11, 120; 340/945, 961, 972, 990, 995, 971, 973, 980; 345/326, 440, 356, 112, 113, 115, 117, 329; 702/121; 714/3, 31; 244/75 R, 76 R, 180, 183, 220, 221

(56) References Cited

U.S. PATENT DOCUMENTS

| | | | |
|---|---|---|---|
| 4,774,670 | * | 9/1988 | Palmieri ............................... 701/204 |
| 4,811,230 | * | 3/1989 | Graham et al. ........................ 701/16 |
| 4,970,683 | * | 11/1990 | Harshaw et al. ...................... 345/353 |
| 5,184,312 | * | 2/1993 | Ellis .................................... 702/121 |
| 5,369,589 | * | 11/1994 | Steiner ................................. 701/200 |
| 5,416,705 | * | 5/1995 | Barnett ................................. 701/14 |
| 5,444,837 | * | 8/1995 | Bomans et al. ...................... 345/440 |
| 5,454,074 | * | 9/1995 | Hartel et al. ......................... 345/326 |
| 5,475,594 | * | 12/1995 | Oder et al. ............................ 701/14 |
| 5,522,026 | * | 5/1996 | Records et al. ...................... 345/326 |
| 6,094,608 | * | 7/2000 | Bomans et al. ...................... 701/14 |
| 6,163,743 | * | 12/2000 | Bomans et al. ....................... 701/3 |

FOREIGN PATENT DOCUMENTS 0 580 474 * 1/1994 (EP) .
0 606 788 * 7/1994 (EP) .

* cited by examiner

Primary Examiner—Jacques H. Louis-Jacques
(74) Attorney, Agent, or Firm—Oblon, Spivak, McClelland, Maier & Neustadt, P.C.

(57) ABSTRACT

Process and device using a flight management system (FMS) for aiding aerial navigation. To facilitate the task of the pilot, the FMS carries out a dialogue with the pilot via a data display and input console (MCDU), which displays a list of tasks to be executed in the form of a succession of selectable and activatable main zones. Each zone corresponds to a task, executed via the console, and when the task has been executed (validation key actuated by the pilot), the list of tasks is redisplayed, with the zones for which tasks have been executed and validated appearing in a different color from other zones. The zones preferably appear in duplicate when there is a co-pilot, so that it is easy to see which tasks have been performed and by which pilot, and which tasks remain to be performed.

2 Claims, 7 Drawing Sheets

METHOD AND DEVICE FOR INPUTTING AND CONTROLLING FLIGHT DATA

BACKGROUND OF THE INVENTION

1. Field of the Invention

The invention relates to processes and devices for assisting aerial navigation.

2. Discussion of the Background

In general, it is known that in aerodynes (aircraft, helicopters, etc.) of modern design, the pilot must carry out a dialogue with a flight management system, this being a computer on board the aerodyne (we shall subsequently speak of an aircraft) for assisting the pilot in a number of operations. These operations are mainly operations for defining the flight plan before take-off, piloting (manual or automatic) operations during take-off and landing, aerial navigation operations (path calculations, etc.), systematic monitoring operations while cruising or when approaching an airport.

The flight management system operates on the basis of data entered by the pilot, data supplied by sensors distributed throughout the aircraft, and possibly digital data transmitted by radio from the ground or from other aircraft or even satellites ("DATALINK" system which is undergoing generalization). The dialogue between the flying crew and the flight management system is carried out mainly by means of at least three interfaces, viz.:

- a navigation display on which is represented the plot of the desired course of the aircraft, that is to say a graphical representation of the flight plan of the aircraft and the situation of the aircraft within this plan;
- a primary flight display which depicts an artificial horizon which tilts as the aircraft tilts, an indication of the longitudinal attitude of the aircraft, and other useful flying indications, in particular the mode of guidance of the aircraft;
- a flight control unit having manual controls for selecting settings such as the desired heading of the aircraft;
- and finally a keyboard/display console, termed MCDU ("Multipurpose Control Display Unit"), this being a data display and input console allowing the flying crew to enter data into the flight management system and to read information forwarded by the flight management system on the basis of the data entered.

The data display and input console possesses firstly a screen, secondly function keys and finally an alphanumeric keyboard.

As is known, the operations to be performed by the flying crew (one pilot or two pilots) during the various phases of the flight are numerous; they have to be executed systematically, in such a way that the flight management system has access to all the necessary flight scheduling and monitoring data.

In particular, a series of monitoring and data input operations have to be performed by the flying crew during the preflight phase and before the approach phase. Still other operations have to be performed en-route.

The pilot who performs the operations must take care that all the operations provided for within the procedure have been executed properly. Furthermore, in the case of dual controls, these operations have to be shared with the assistant pilot and the operations performed by one of the pilots have to be verified by the other. The communication between the two pilots is verbal, the cockpit comprising two identical sets of flying controls located side by side, each set containing identical interfaces with the single flight management system (or twin system together with a synchronization mechanism).

SUMMARY OF THE INVENTION

An objective of the invention is to propose a process and a device for aiding aerial navigation which make it easier for the pilot to execute the tasks incumbent upon him in connection with the flight management system during the various phases of a flight.

The process uses the flight management system and its data display and input console; the console is of a type which makes it possible in particular to select predetermined zones of the display in order to trigger the execution of operations corresponding to the selected zone. The process consists in:

- simultaneously displaying on the screen of the console a series of main zones which follow one another from the top to the bottom of the screen, each zone corresponding to a step of a navigation procedure,
- in the event that a user selects a main zone corresponding to a specified procedural step, displaying on the console elements of information necessary for executing this step,
- in the event that an item for validating the procedural step corresponding to the selected main zone is input into the console, once again displaying the series of main zones, the main zones for which the procedural step has been validated appearing at least in part in a different colour from the main zones for which the procedural step has not been validated.

And in the case in which two control panels are provided, with two display and data input consoles communicating with one and the same flight management system, there is preferably provision for another main zone corresponding to the same procedural step to be associated with each main zone, one of the zones being situated on the right and the other on the left of the screen. A procedural validation performed from the left-hand control panel causes the left-hand zone to appear in a different colour, on both consoles, whereas a validation performed from the right-hand control panel causes the right-hand zone to appear in a different colour, on both consoles. In this way it is easy to see on the screen on the one hand whether all the procedural steps have been executed, and on the other hand who has performed each of them.

In this case of a duplicate zone for each procedural operation, provision may be made either for two separate zones, side-by-side, to be provided, with written indications repeated in the two zones, or for a single duplicate zone to be provided, divided into two, with a single written indication extending over the two parts of the duplicate zone. Half of the zone then changes colour depending on the console from which the validation was made.

The invention relates not only to the process which has just been summarized, but also to a device for aiding aerial navigation.

The device according to the invention uses a flight management system which carries out a dialogue with the pilot by means of several interfaces which include at least one data display and input console, and it is characterized in that it comprises means for simultaneously displaying on the screen of the console a series of main zones which follow one another from the top to the bottom of the screen, each zone corresponding to a step of a navigation procedure, user-actuatable means for selecting a specified main zone, means for exhibiting on the console, when a main zone is selected, a display necessary for executing the procedural step corresponding to this main zone, means for inputting into the console an item for validating the procedural step and for then once again displaying the series of main zones, the main zones for which the procedural step has been validated appearing in a different colour from the main zones for which the procedural step has not been validated.

Among the advantages of the invention may be mentioned in particular the fact that the system is proof against interruptions: the pilots are frequently interrupted in their check sequences, most especially in the preflight phase. With the invention, they have available a summary of the steps already performed and they can return rapidly to their sequence of checks; they need not run through successions of pages of tasks in order to recollect the steps already performed.

Moreover, the process will support the new "DATALINK" mode of dialogue in which information is transmitted between the ground and the panel by radio: it will be possible for information sent by the ground to the flight management system to appear in the steps of the procedure, in a particular form which attracts the attention of the pilot. The pilot will verify and accept this information in the same way as if he had entered it himself.

Other characteristics and advantages of the invention will emerge on reading the detailed description which follows and which is given with reference to the appended drawings in which:

DESCRIPTION OF THE PREFERRED EMBODIMENTS

Figure 1:
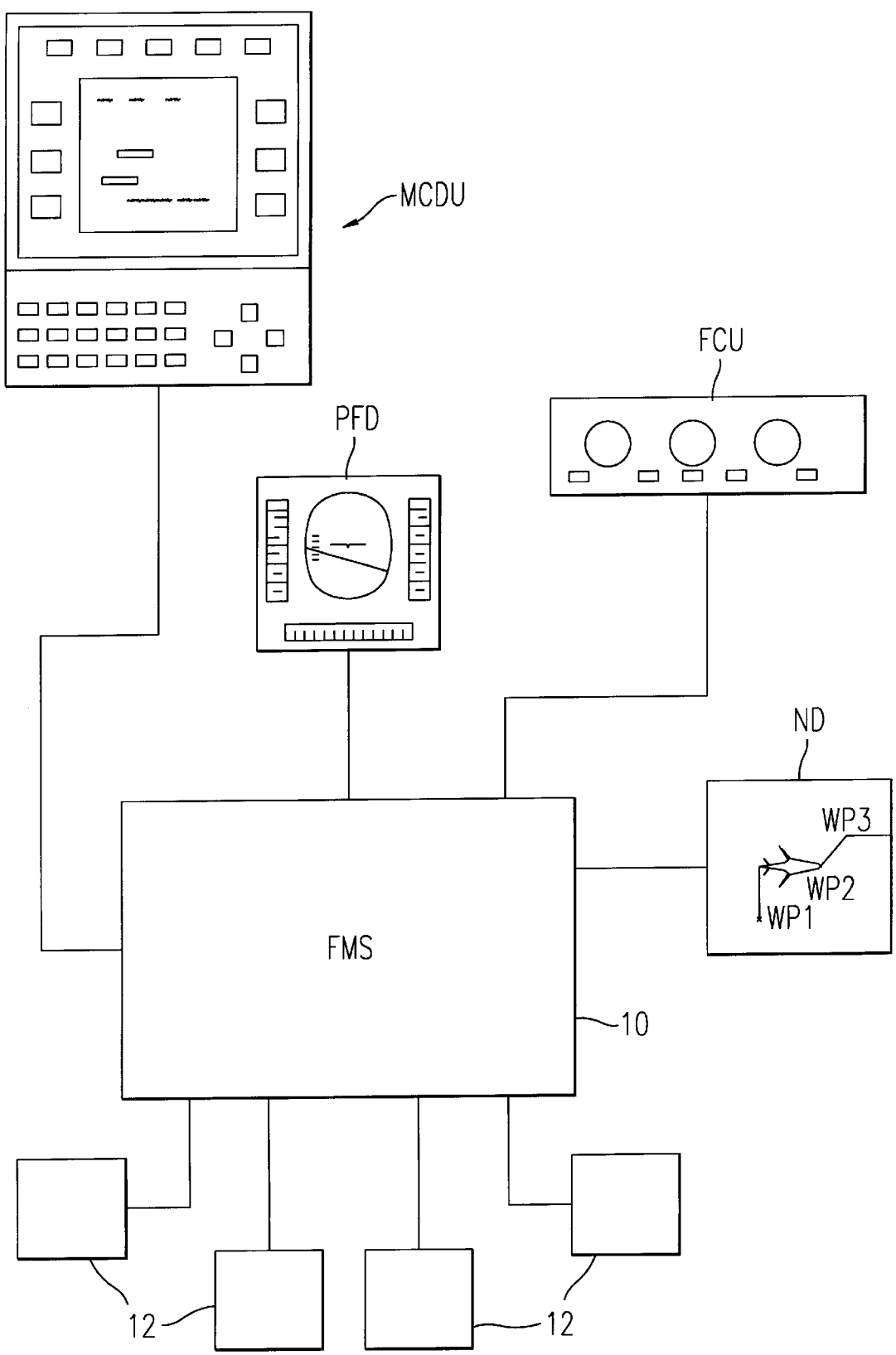
FIG. 1 represents the complete device for aiding navigation according to the invention.

FIGS. 2 to 6 comprise indications written such as they may appear in reality in an airliner, hence in the form of words or abbreviations or mnemonics.

The device for aiding navigation according to the invention constitutes a part of an overall aircraft monitoring system. This overall system essentially comprises:

the flight management system or FMS, this being a computer 10 which can receive various information, can calculate other information and can forward it to the pilot by means of dialogue interfaces;

sensors 12 distributed throughout the aircraft, including for example navigation instruments (IRS inertial units, etc.), various sensors giving information about the state of the aircraft, optionally instruments for communicating with the outside, all of these sensors being linked to the flight management system;

the interfaces for carrying out a dialogue with the pilot, which are linked to the computer 10, and which will mainly include:

a flight control unit or FCU which makes it possible, with the aid of buttons, to select for example the heading of the aircraft, or other settings which have to be supplied to the management system;

a screen for displaying navigation information, ND ("Navigation Display"), for displaying maps, flight plans etc., a primary flight display PFD for displaying an artificial horizon, altitudes of the aircraft, attitudes, velocity vectors, an indication of guidance mode ("Flight Mode Annunciator"), etc., a data display and input console or MCDU ("Multipurpose Control Display Unit"); this console is the instrument of main dialogue as regards the present invention, and it operates under the direct control of software contained in the FMS computer. Naturally, the console itself may contain suitable software necessary for its operation, in the general case where this console comprises a microprocessor and circuits controlled by this microprocessor. For example, the routines for displaying plots on the screen, the routines for managing the data entry keyboard, etc. are suitable for the console and the corresponding software can be built into the console, whereas the information to be displayed generally arises from the software contained in the FMS computer.

In this overall system, the elements required to implement the present invention are the FMS computer (since the dialogue to be envisaged is dialogue between the pilot and the computer), and the MCDU console.

The MDCU data display and input console comprises a keyboard, a screen, function keys and means for selecting zones displayed on the screen and activating the selected zone so as to trigger operations which relate to what is displayed. These selection and activation means are the analogue of the well-known "mouse" used in the field of microcomputers, that is to say they are means which make it possible to move a cursor (visible or invisible) around a menu displayed on the screen in order to select a zone proposed by this menu, which zone becomes highlighted for example when the cursor passes over this zone;

and to activate a selected zone (the "click" button of the mouse).

In aeronautics a mouse is not normally used but rather shift keys, or else there is provision for the screen to be a touch screen, the designating of a zone by the finger bringing about the selection of this zone; alternatively, it is possible to use a touch tablet next to the screen. All these means for selecting zones on the screen are equivalent.

The function keys of the console can be laid out all round the screen, but it will be noted that they could even be displayed on the screen itself, for example around the periphery of a central region of the screen; in this case, the function keys are activated exactly in accordance with the principle indicated above by the zone selection means; the keys displayed on the screen are particular selectable zones which it is possible to "click" on. This is the particular case which is represented in the figures which show peripheral function keys around a central region which is termed the "message display region". The fact that the function keys are displayed on the screen makes it possible to reconfigure them more easily in order to modify the functions associated with these keys as required.

The navigation aid functions afforded by the present invention will now be described. These functions are carried out by using the EMS computer programmed specifically for executing the various display operations required.

To aid the understanding of the invention, a realistic navigation scenario will be described, during which the pilot (or the two pilots, namely the on-duty pilot PF and the off-duty pilot PNF respectively) uses the navigation aid means proposed by the invention.

The concrete example is an incident-free flight from Paris-Charles de Gaulle airport (CDG) to Frankfurt airport (FAR).

In this example, the scenario contains 7 major phases:
preflight
taxiing towards the take-off strips
take-off
climb
cruising
descent
approach At any instant, the flight management system is aware of which phase it is in because the operations performed by the pilot are monitored constantly by this system and because the behaviour of the aircraft is detected continuously by the sensors connected to the system.

1. Preflight

This is the phase during which the pilot defines his flight plan and initializes all the parameters of the aircraft (weight in particular).

Among the function keys of the MCDU console there is a specific key used in the present invention, namely the DO_LIST key. As has been stated, this key may either be a hardware key or a software key displayed on the screen and selectable by the zone selection means.

Figure 2:
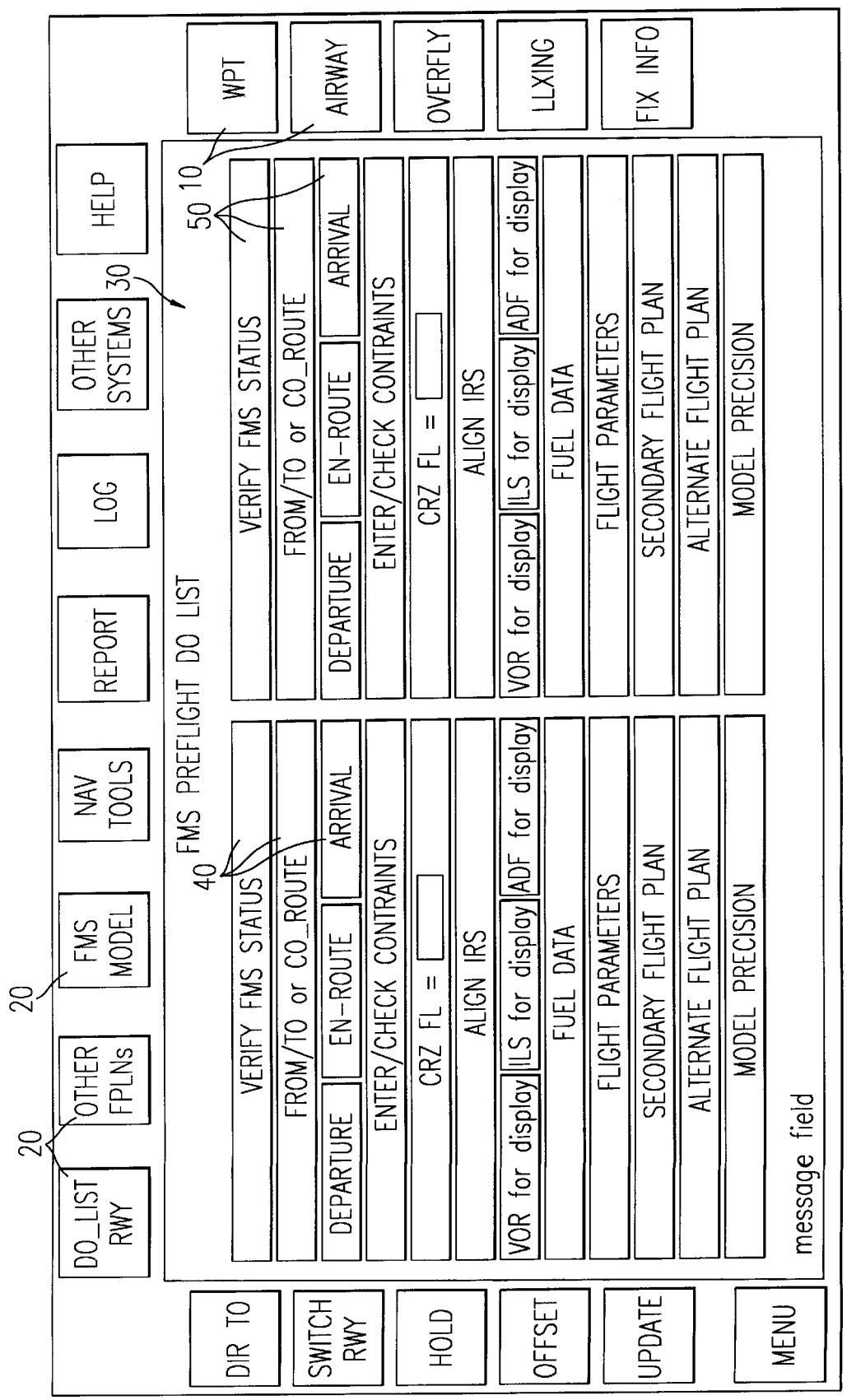
FIG. 2 represents the screen of the console at the start of a navigation procedure.

When the DO_LIST key is activated, an image such as that which may be seen in FIG. 2 is displayed by the FMS computer in the message display region; in this image, the function keys 20 such as the DO_LIST key still remain displayed, around the central message display region.

The image displayed in the central region of the screen comprises principally:
an information header 30,
selectable and activatable main zones 40.

The main zones each contain information relating to procedural steps to be executed by the pilot in the preflight phase; when they are selected by the user they may be highlighted (or change colour, etc.) so that this selection is visible.

In FIG. 2, there are two identical columns of main zones: zones 40 in the left-hand column and zones 50 in the right-hand column. Initially, only the zones 40 of the left-hand column will be considered.

Generally, when a specified main zone is activated after having been selected, it triggers the displaying by the computer of messages and requests for data required in executing the procedural step corresponding to this zone. The main zones follow one beneath the other and/or one next to the other in an order which corresponds to the order of the procedure to be executed by the pilot.

When the aircraft is on the ground and in the preflight phase, the FMS computer is aware that it is in this phase, and this is why the depressing of the DO_LIST key has displayed the messages visible in FIG. 2. If the computer had detected that the aircraft was in some other phase, the depressing of the DO_LIST key would have brought up some other series of main zones, with other procedural indications, the activation of these different zones then triggering operations other than those which correspond to FIG. 2.

The list of procedural steps which is displayed in FIG. 2 and corresponds to the preflight phase comprises:

a header which provides a reminder that the menu displayed is a list of steps of the preflight procedure to be performed by the pilot a written indication regarding the content of each step, in the various main zones which follow one another from top to bottom and from right to left.

Those expert in this matter will readily recognise the significance of the indications carried on the screen, these indications always being in English in aeronautics. The indications given are realistic indications but are merely examples, it being understood that other indications could be given in respect of the same operations and that other procedural operations could be elected in respect of a specified phase of flight.

The following procedural steps are listed in FIG. 2:
verification of the status of the flight management system,
indication of the route
data regarding departure (airport runway, etc.), en-route, arrival,
cruising altitude
alignment of the inertial systems with the longitude and latitude of the airport,
enforced display of radionavigation means chosen by the pilots,
fuel data: weight and centre of gravity
flight parameters
secondary flight plan
alternative flight plan
display of a model of precision.

Certain steps may be obligatory within the procedure and others optional, for example here the last three are optional. The optional steps can be displayed in a slightly different form from the others (grey background for the former and black background for the latter for example).

If the user selects and activates a specified main zone, the computer displays a new screen, consisting mainly of information and requests for information.

Figure 3:
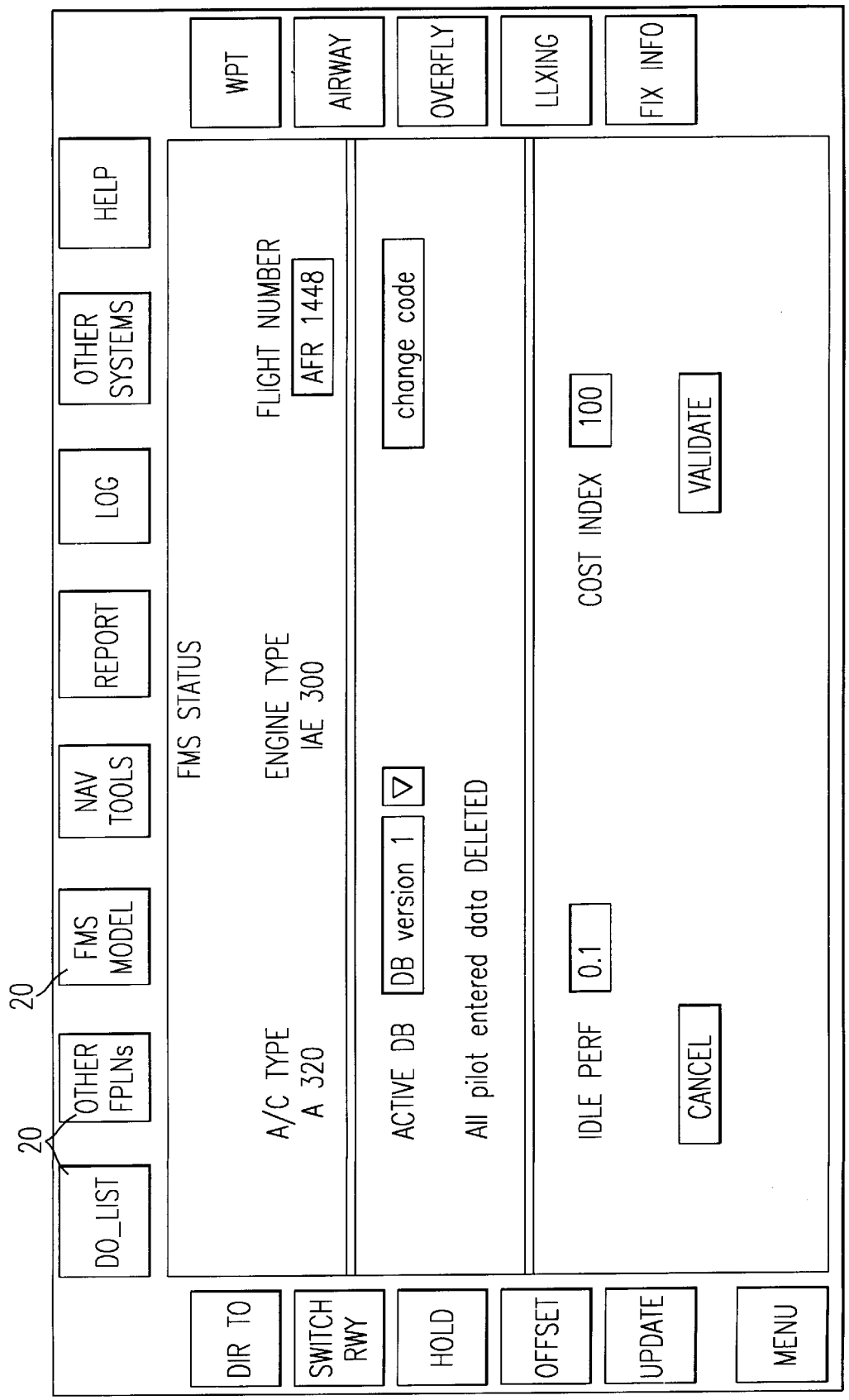
FIGS. 3 to 6 represent the screen at different steps of the procedure.

Thus, when the pilot selects and activates the first main zone, in which the indication for the "Verify FMS status" procedural step is displayed, the screen shows the display represented in FIG. 3, comprising
a header ("FMS Status") providing a reminder that this is the verification step,
messages (mainly information and requests for information),
zones reserved for entering the information requested,
a "Validate" button, and preferably also a "Cancel" button should the pilot wish to return to the menu without executing the current procedural step or delete the latest data input.

In this example, the FMS computer displays the type of aircraft and engine on the screen and requests information such as the scheduled flight number. This number, here "AFR1448", is entered at the keyboard by the pilot after he has selected the zone corresponding to this entry (or after the computer positions itself automatically on this zone). The pilot similarly enters the other data requested by this screen page.

When the messages corresponding to this procedural step have thus been received by the user and when the data requested have been keyed in, the user validates the operation (selection and activation of the "validate" zone), signifying that from his point of view the procedural step has been executed.

Validation may be performed by depressing a validate button, or selecting and clicking on an "OK" zone, or any other conventional validation solution: for example, the complete entry of the data requested by the computer in the relevant screen page may be interpreted by the computer as an action of validation for this page.

The operations to be performed by the user in respect of a specified procedural step may involve the successive scrolling of several screen pages, the final validation of the execution of the procedural step then being performed on the last page displayed on the console by the FMS computer.

When validation has been performed for a specified main zone, the computer once again displays the screen page visible in FIG. 2, but the main zone which corresponds to the procedural step now validated appears in a different colour from the main zones corresponding to the other zones not yet validated.

Figure 4:
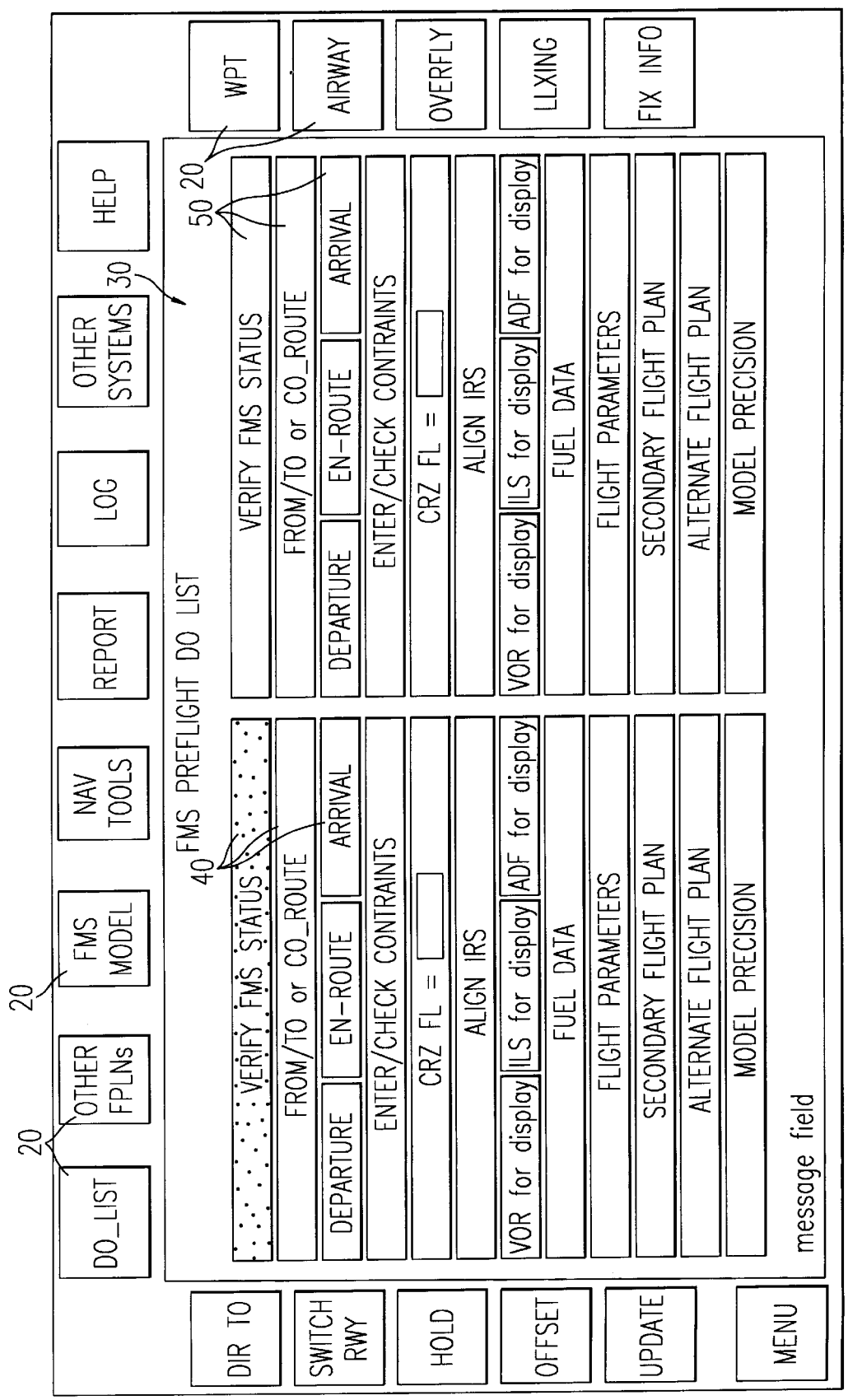

FIG. 4 represents the screen at this stage. The different colour is symbolized by a scatter of points.

The pilot will thus perform the successive procedural steps proposed by the "FMS Preflight DO_LIST" screen, and the zones corresponding to the validated steps will appear in the colour corresponding to the validation.

The list visible on this screen therefore comprises, in different colours, the procedural steps already performed together with the procedural steps which remain to be performed, thus very graphically affording the pilot a precise awareness of the situation at a given moment as against his obligations.

Figure 5:
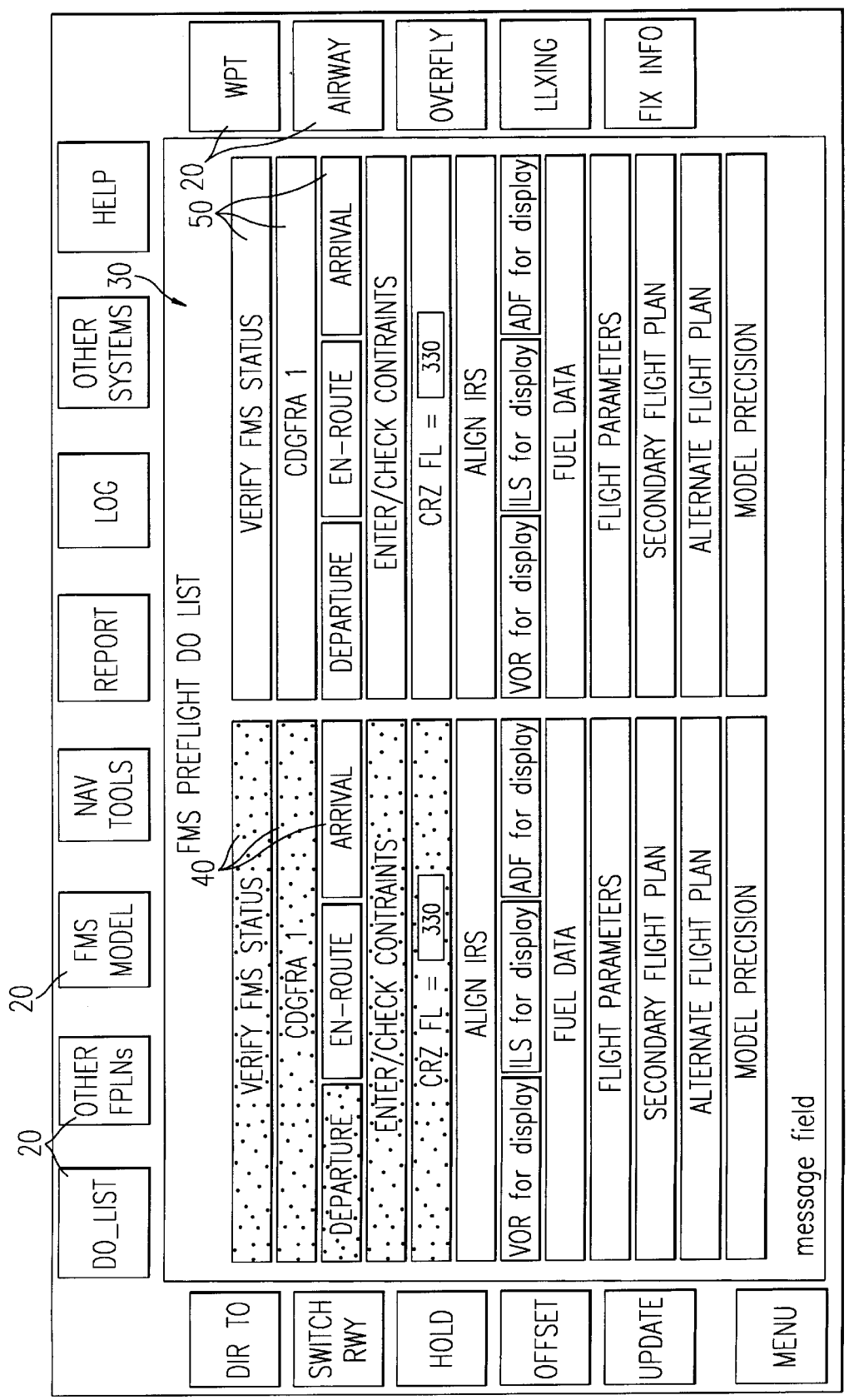

It will be noted that the indications carried in the main zones can be modified after validating the relevant step: FIG. 5 shows that the second step "FROM/TO or CO-ROUTE" (see FIG. 2) has also been executed since it is ticked, but the "CDGFRA1" indication has appeared in the corresponding zone to indicate to the pilot that the route keyed in is the Charles de Gaulle/Frankfurt route.

Likewise, an altitude of 33000 feet (10000 metres) is now indicated in the form "FL330" in the CRZFL main zone which corresponds to the step of choosing the cruising altitude. The corresponding auxiliary zone, to the left of the main zone, is ticked.

And so on and so forth, the procedure can be executed in full, including the optional steps, and at any moment the pilot knows where he is in the procedure, even if he is interrupted during execution, which frequently happens in reality.

2. Other Phases of Flight

Detailed explanations have been given with regard to the procedural steps of the preflight phase. The same principle is used for the other phases of flight if there is a list of procedural steps, or a list of checks to be performed. In practice, it is the descent phase prior to the approach phase which requires a new series of verifications and data inputs.

The pilot again depresses the DO_LIST key, and the FMS computer, aware of which phase of flight it is in, then displays on the screen the list of operations to be performed, which differs from that of FIG. 2, but is presented in the same way as main zones corresponding to the procedural steps to be performed in this phase.

According to another very advantageous possibility of the invention, an enhancement to the system according to the invention may be provided in cases where the aircraft is manoeuvred by a crew of two pilots, one of whom is called the on-duty pilot PF or pilot flying and the other the off-duty pilot PNF or pilot non-flying.

The pilots each occupy a seat equipped with dialogue interfaces, and these interfaces are identical for the two pilots and are linked in a similar manner to the FMS computer. The two MCDU consoles are controlled independently by the pilots, the computer being able to distinguish between the two consoles both for display and for data input.

It is thus proposed according to the invention that the zones 40 of the left-hand column are associated with the left-hand pilot and the zones 50 of the right-hand column are associated with the right-hand pilot. Only the left-hand pilot can activate a zone 40, and only the right-hand pilot can activate a zone 50. And only the activated and validated zone changes colour. It is thus clearly apparent on the screen not only which are the validated steps but also which pilot has performed each of them. And this appears in an identical manner on the consoles of both pilots. It is indeed common for one of the pilots to ask the other to perform certain operations; thus, at any instant he can be certain of what has been done without needing to memorize both his own actions and those of his colleague.

Figure 6:
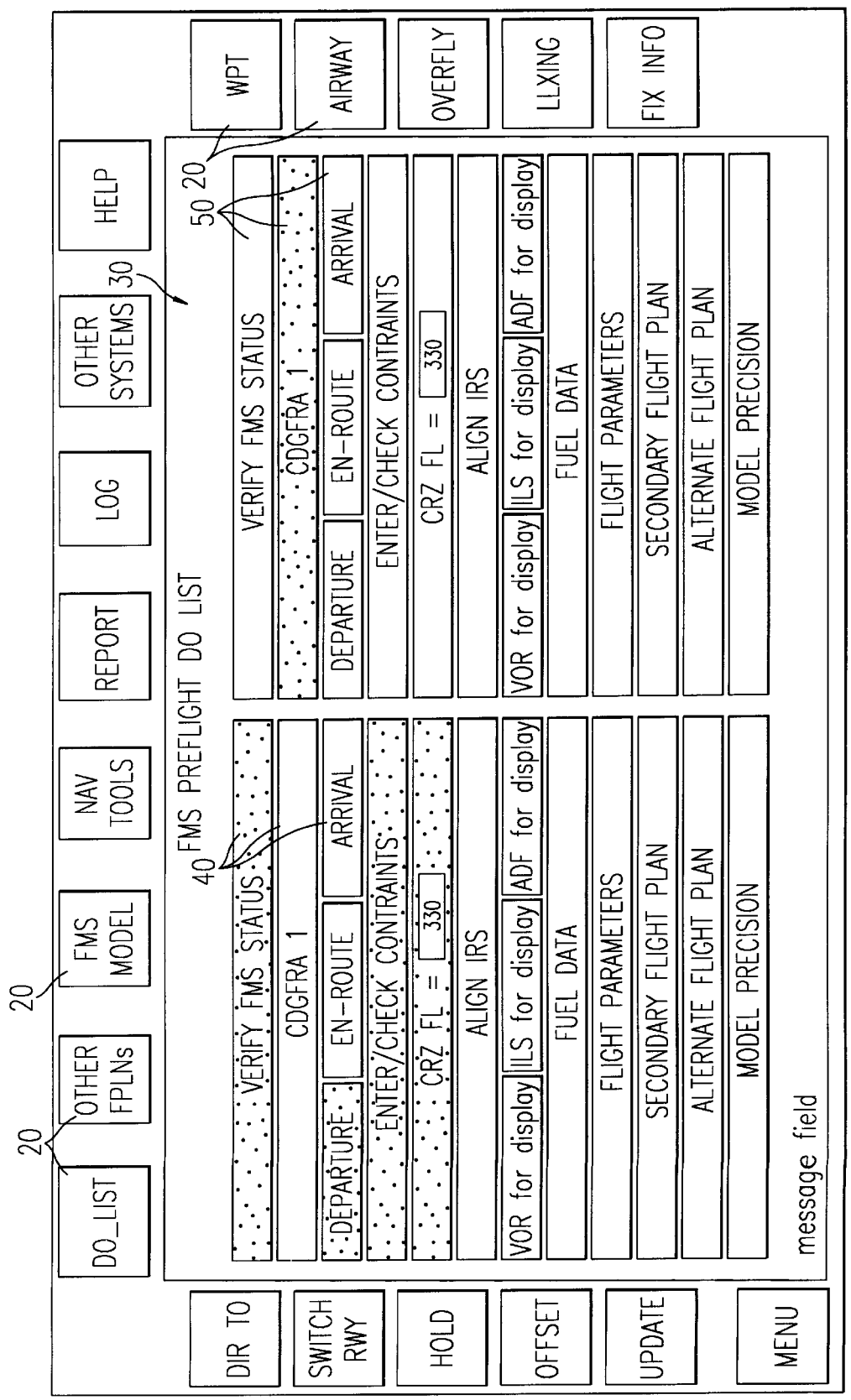

FIG. 6 represents a corresponding example in which one of the operations has been performed by the right-hand pilot. The two consoles display the same image.

Figure 7:
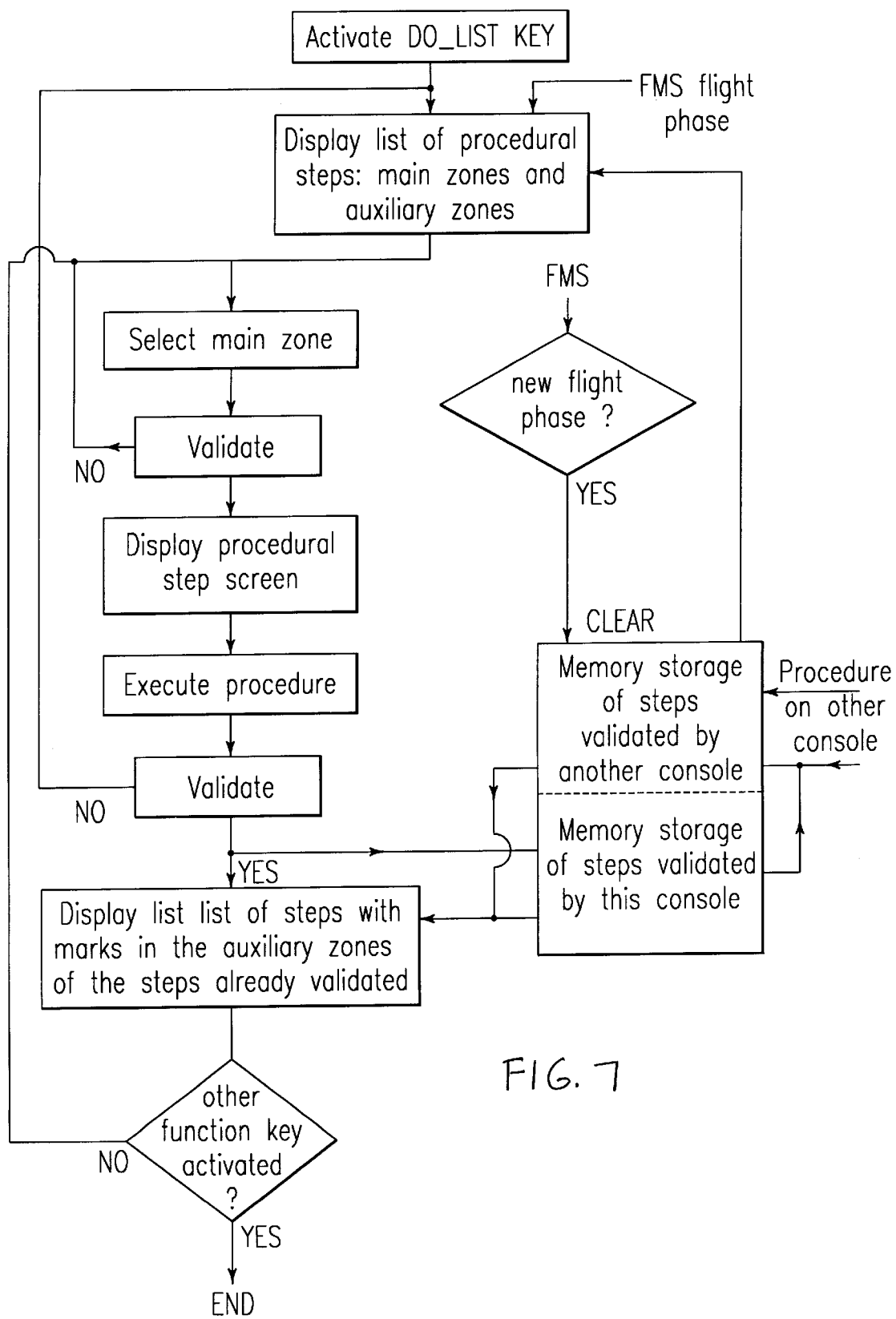
FIG. 7 represents a flow chart of the operation of the flight management system in respect of functions relating to the invention.

Of course, the invention is carried out by suitably programming the FMS computer, and the overall flow chart for the operation of the software part corresponding to the invention is recalled in FIG. 7. In this flow chart are shown, corresponding to the display on one of the consoles:

the displaying of the menu of procedural steps when the "DO_LIST" function key is activated, the display depending on the current flight phase; the main zones are displayed in the validation colour only for procedural steps which have already been performed, especially by the other pilot on the other console;

the selecting and validating of a main zone, with the displaying of a new corresponding screen;

the validating after execution of a procedural step, and the placing of this validation information into memory, with a view to subsequent displaying on the two consoles if there are two;

the new displaying of a menu of steps with validation colour for the zones corresponding to the steps already validated;

the clearing of the tick memory if there is a change of flight phase, given that the menu of procedures displayed by activating the DO_LIST key depends on the flight phase; and the displaying in the new menu of the information input during the previous phases and which is still valid in the new phase;

the possibility of continuing the procedure by selecting a new procedural step, or the end of the procedure if some other function key is activated.

In practice, the two essential phases for which the DO_LIST menu will be used will be the preflight phase and the approach phase. The menu displayed at the start of the approach phase procedure will include zones which are not yet validated (erasure of the validations memory) but will additionally include indications which have been input during the preflight phase (that is to say the validations memory has been cleared, but other information which still has validity is not cleared).

In the figures described earlier, the two zones, left and right, corresponding to the two consoles were regarded, for each procedural step, as being completely separate and comprising a duplicate indication with regard to the procedure performed. However, provision may also be made for the two zones to be contiguous and to form a single rectangle in which a single indication is registered. In this case half the rectangle changes colour depending on the console from which the procedural step was validated. The pilot designates this duplicate zone by clicking in the rectangle without needing to worry about clicking particularly in the right part or particularly in the left part. The written procedural indications can be more readable since a rectangle of twice the size is available.

What is claimed is:

1. Process for aiding aerial navigation using a flight management system coupled to first and second consoles each configured to allow selection of predetermined zones of respective first and second screens so as to execute operations corresponding to the various zones, comprising:

simultaneously displaying on each screen a first series of main zones which follow one another from a top to a bottom of the screen, each main zone corresponding to a step of a navigation procedure and a second series of main zones corresponding to the same procedural steps associated with the first series of main zones, one of the first and second series of main zones being displayed on a right side of each screen and the other series of main zones being displayed on a left side of each screen, in the event that a user selects a main zone corresponding to a specified procedural step, displaying on each screen elements of information necessary for executing the specified procedural step; and in the event that a validation of the specified procedural step corresponding to the selected main zone is input into one of said consoles, once again displaying the first and second series of main zones on each screen, the main zones for which a procedural step has been validated appearing, at least in part, in a different color from the main zones for which a procedural step has not been validated, wherein, when a procedural validation is performed from a left one of said consoles, the main zone appearing in a different color is displayed within the series of main zones on the left side of each screen, and when a procedural validation is performed from a right one of said consoles, the main zone appearing in a different color is displayed within the series of main zones on the right side of each screen.

2. Device for aiding aerial navigation using a flight management system which carries out a dialogue with the pilot and copilot by means of several interfaces which include first and second consoles having first and second screens respectively, comprising:

means for simultaneously displaying on each screen a first series of main zones which follow one another from a top to a bottom of the screen, each main zone corresponding to a step of a navigation procedure and a second series of main zones corresponding to the same procedural steps associated with the first series of main zones, one of the first and second series of main zones being displayed on a right side of each screen and the other series of main zones being displayed on a left side of each screen;

means for selecting a specified main zone corresponding to a specified procedural step;

means for displaying, on each screen, elements of information necessary for executing the specified procedural step corresponding to the selected main zone, means for inputting a validation of the specified procedural step corresponding to the selected main zone;

means for, when said validation is input to one of said consoles, displaying said first and second series of main zones on each screen, the main zones for which a procedural step has been validated appearing, at least in part, in a different color from the main zones for which a procedural step has not been validated, wherein when a procedural validation is performed from a left one of said consoles, the main zone appearing in a different color is displayed within the series of main zones on the left side of each screen, and when a procedural validation is performed from a right one of said consoles, the main zone appearing in a different color is displayed within the series of main zones on the right side of each screen.

* * * * *